July 7, 1931. W. H. MORGAN 1,813,070
APPARATUS FOR DISINTEGRATING SUGAR CANE
Original Filed Feb. 28, 1925 4 Sheets-Sheet 3
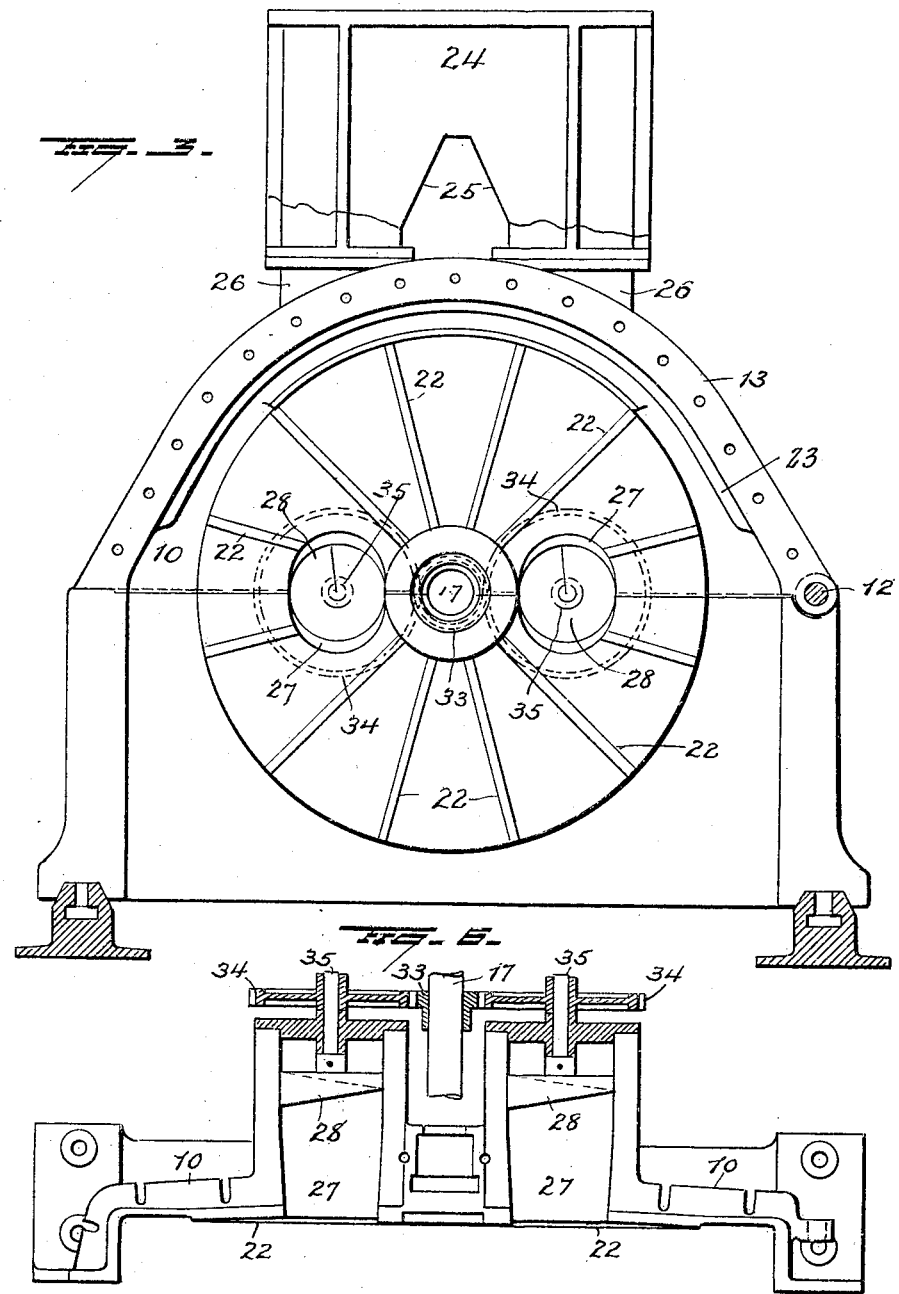

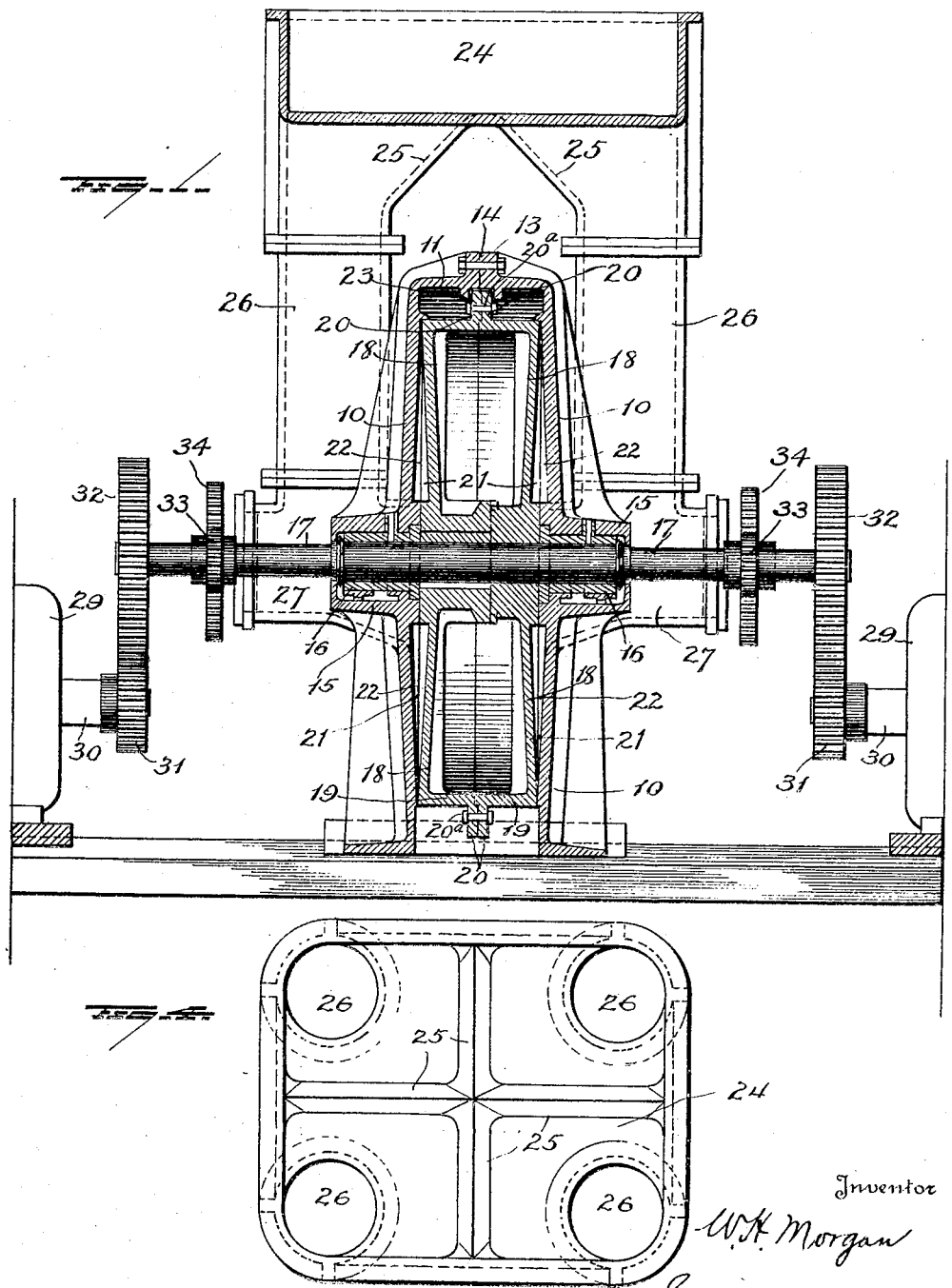

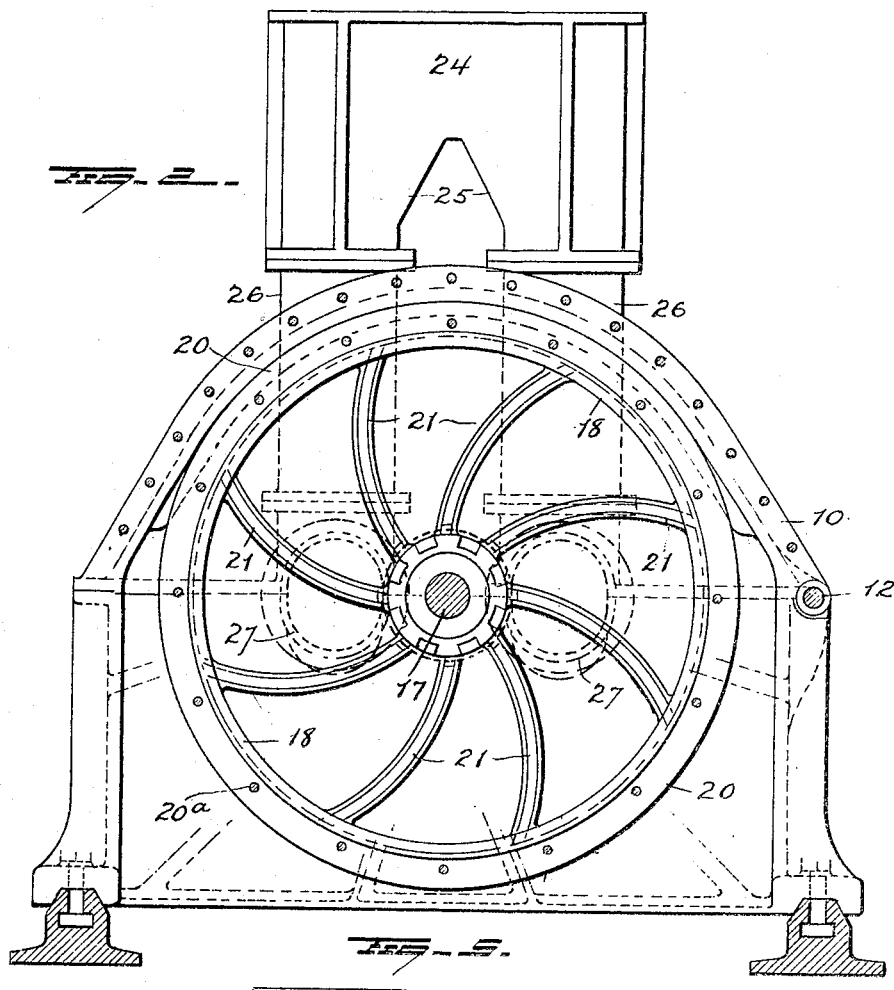

July 7, 1931.    W. H. MORGAN    1,813,070
APPARATUS FOR DISINTEGRATING SUGAR CANE
Original Filed Feb. 28, 1925    4 Sheets-Sheet 4
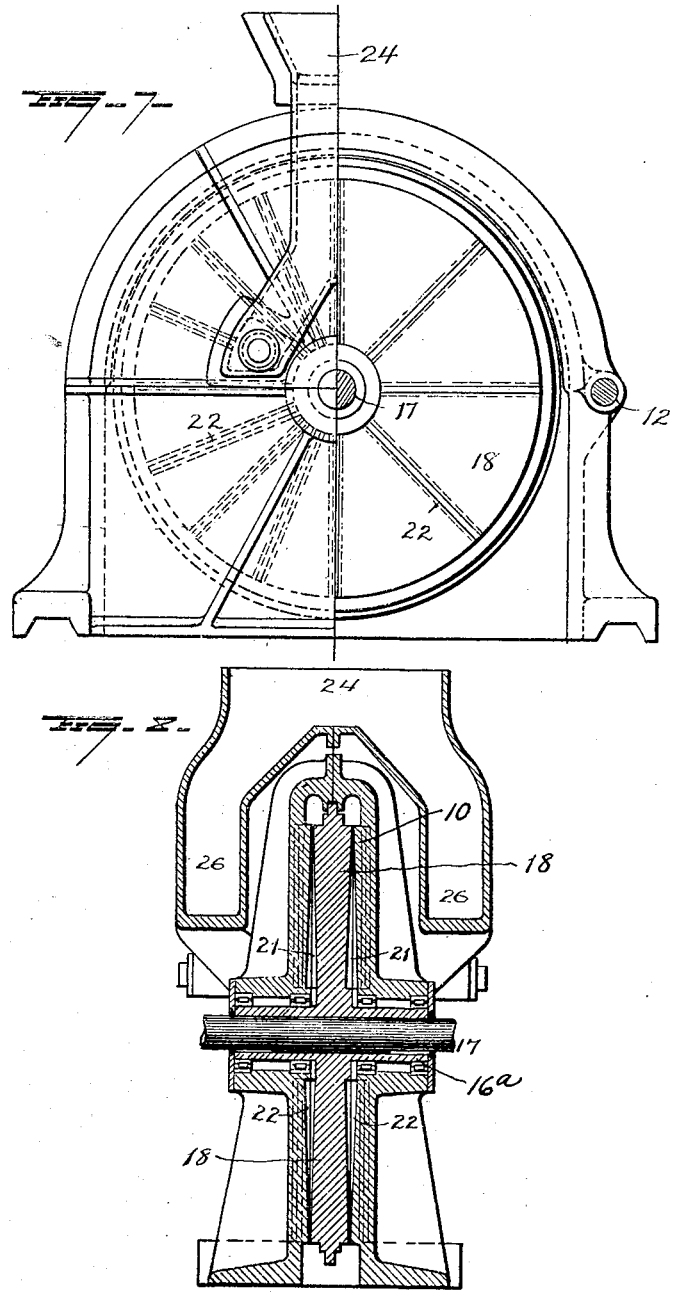
Inventor
W. H. Morgan
By Seymour & Bright
Attorneys Patented July 7, 1931

1,813,070

UNITED STATES PATENT OFFICE

WILLIAM HENRY MORGAN, OF ALLIANCE, OHIO, ASSIGNOR, BY MESNE ASSIGNMENTS, TO THE MORGAN HURRYCANE COMPANY, OF NEW YORK, N. Y., A CORPORATION OF FLORIDA

APPARATUS FOR DISINTEGRATING SUGAR CANE

Application filed Febuary 28, 1925, Serial No. 12,410. Renewed December 26, 1930.

This invention relates to machines for disintegrating sugar cane to prepare the cane for the extraction of the juice therefrom.

The principal objects of the invention are to improve the construction and mode of operation of machines for disintegrating sugar cane and to produce a disintegrating machine embodying certain novel and improved features which will efficiently reduce sugar cane to a disintegrating mass containing relatively long fibres of the cane.

In the accompanying drawings;

Figure 1 is a central transverse vertical section, the disk carrying shaft being in elevation;

Figure 2 is a view partly in side elevation and partly in central vertical section taken in a plane substantially perpendicular to the axis of the main shaft.

Figure 3 is a view similar to figure 2 with the rotary disk removed;

Figure 4 is a view in plan of the hopper and also showing the chutes leading from the latter to the feed spouts which direct or feed the cut stalks to the disintegrating apparatus;

Figure 5 is a view in horizontal section of one of the side frames of the apparatus;

Figure 6 is a view of the lower section of the casing showing the feed spouts thereon and also showing the feeders for forcing the cut stalk into the disintegrator ;

Figure 7 is a view in side elevation of the disintegrator, part of the hopper being cut away, and Figure 8 is a view in transverse vertical section of a modification.

The cane to be shredded or disintegrated into fine fibres, is harvested and cut up into comparatively short sections by an apparatus especially designed for this purpose. The cane may be cut into short lengths in the field or plantation, or in the mill. If cut up in the mill the short sections can be fed directly to the disintegrator or shredder, but when the cutting is done in the field the cut portions will be transported to the mill in the manner now commonly employed for transporting cane stalks.

The disintegrator or shredder comprises a housing or frame 10, made preferably of four sections, each half of the housing shown in Figures 2 and 3 being in two sections as shown in said figures. The two upper sections of the housing are hinged to the lower sections by means of a hinge 12 so that the whole of the upper half or portion of the housing can be turned on the hinge 12 to expose the disintegrating or shearing blades, or for other repairs that may be needed to the inside of the apparatus.

The two sections consituting the upper half of the frame or housing may be cast integral, or the upper half of the housing may be made in two sections provided with peripheral flanges as shown at 13 in Figure 1 and the said sections may be secured together by bolts or rivets 14.

The sections of the housing are provided centrally with outwardly projecting hubs 15 which carry the main bearings 16. Keyed to shaft 17 is the hollow disk 18 preferably made in two sections each of which is provided at its periphery with a laterally projecting flange 19, terminating in a radially projecting flange 20 which latter abut as shown in Figure 1, and are secured together by rivets or bolts 20ª, thus forming a hollow disk, the outer side faces of which are spaced from the inner surfaces of the frame 10.

The disk 18 is of substantially the same width as the space between the side members of the housing 10, the hub portion of the disk bearing against the central portions of the housing, as clearly shown in Figure 1. From this hub portion to its peripheral portion on each side thereof, the hollow disk is spaced from the side portions of the housing to provide chambers into which the cane is fed in the disintegrating operation. These chambers each diminish in width from the central toward the peripheral portion of the disk.

Each outer face of the disk 18 is provided with a series of curved or scimiter shaped grooves to receive the correspondingly shaped disintegrator blades 22, the forward faces of which are preferably substantially perpendicular to the plane of rotation and the cutting edges of which co-act with disintegrator blades 21 secured in grooves in the inner faces of the housing or frame 10. These disintegrator blades or cutters 21 are preferably straight and radial to the axis of the disks as shown in Figure 3 and the blades or cutters on the housing and the disk, are so adjusted that their meeting faces or shearing edges are approximately in contact, and may be adjusted when necessary by shims inserted in the grooves under the cutters.

The disk 18 is prevented from wabbling motion by the flanges 23, formed on the inner face of the casing or frame and overlapping the flanges 20 on the rotating disk 18.

Located above the disintegrator, is the hopper 24 preferably divided by partitions 25 into four sections, which direct the cut stalks into the chutes 26 attached at their lower ends to the feed spouts 27. These spouts, as shown in Figure 3 are located upon opposite sides of the shaft 17 and open into the interior of the frame or housing 10, so that the cut stalks may be fed into the spaces between the inner faces of the frame 10 and outer faces of the central rotating disk.

In order to facilitate the feed of the stalks to the cutters or, rather, positively feed the stalks to the cutters, I have provided conveyors or feeders 28, which may be of any approved form, but are shown as having wedge shaped or spiral faces for positively feeding the cut stalks, as they drop from the chutes into the spouts. The stalks are fed by the feeders into the spaces between the frame 10 and rotating disk 18, are picked up, and carried around by the rapidly rotating disintegrating blades on the side faces of the rotating disk and are disintegrated by the cooperative action of the fixed and rotating blades.

The spouts may be in sections divided horizontally in the same plane as the two sections of the sides of the frame or housing, so that when the upper section of the frame is turned back for inspection or repairs to the inside of the disintegrator, the upper halves of the spouts will be carried away from the lower halves thereof by the upper section of the frame, which latter also carries the hopper 24.

The shaft 17 is driven by the motors 29, the armature shafts 30 of which, each carry a small gear 31 meshing with the larger gears 32 carried by the shaft 17 at the ends thereof. This shaft 17 is also provided with pinions 33 (see Figure 6) which mesh with the gears 34 on the shafts 35 carrying the feeders 28, so that when the machine is in operation the feeders will be rotated to maintain a continuous supply of stalks to the machine. The lower sections or halves of the spouts are preferably formed integral with the lower members of the main frame or housing 10.

In the construction shown in Figure 8, the rotating disk is solid instead of hollow. In other respects the devices are substantially identical with the hollow disk construction.

In the operation of the apparatus, the cane stalk material to be disintegrated, is fed into the hopper and gravitates from the latter down the four chutes and is fed by the conveyors or feeders 28 into the housing or frame 10. As the hollow disk 18 is rapidly revolved by the gearing and motors or other driving means, the material, as it is engaged by the scimiter shaped knives or disintegrators 21 on the rapidly rotating disk, will be carried and thrown by centrifugal force outwardly between the shredders or cutters on the main frame and on the rotating disk, and will be disintegrated or cut up into a fibrous mass and thus put in a condition to be readily passed between juice extracting rolls without any further crushing. The knives or cutters on the revolving disk being scimiter shaped, also have a tendency to aid the progress of the cane stalks from the center outwardly toward the periphery of the disk where it is discharged through the open bottom of the frame or housing 10 into a receptacle or onto a conveyor.

The construction shown in Figure 8 is substantially the same as the apparatus above described, except that the center disk instead of being hollow as explained, is made solid and preferably in a single casting. The latter is provided with shredders or disintegrating knives set in grooves, which shredders or knives cooperate with similarly shaped knives on the inner faces of the frame or housing 10.

It is evident that many slight changes might be resorted to in the relative construction and arrangement of parts shown and described without departing from the spirit and scope if my invention hence I would have it understood that I do not wish to confine myself to the exact construction and arrangement of parts shown and described but, Having fully described my invention what I claim as new and desire to secure by Letters-Patent, is:—

1. In an apparatus for reducing sugar producing material into a fibrous mass, comprising a fixed hollow frame or housing having shearing means on the inner faces of its sides and extending approximately from the center of the housing toward the periphery thereof, a shaft mounted to rotate in said housing, a disk fixed to said shaft and having shearing means projecting outwardly on its two side faces approximately from its hub to its periphery, each of the two shearing chambers formed by the housing and disk being approximately the same size and shape, the said shearing means on the housing and disk cooperating to break the material fed to the interior of the housing into a fibrous or excelsior like mass, and a hopper common to both shearing chambers, whereby the material will be fed simultaneously to both sides of the disk like member substantially as and for the purpose set forth.

2. In an apparatus for shearing sugar cane stalks, the combination of a housing having cutters on the inner faces of its sides, and a discharge opening at its bottom, a rotary shaft passing through said housing, a disk fixed on said shaft and provided on its opposite faces with cutters coacting with the cutters on the housing, and a hopper located above the housing and provided with chutes for conveying the stalks into the housing at both sides of the disk.

3. In an apparatus for shearing cane stalks, the combination of a housing having a discharge opening in its base, and a series of shearing means secured to the inner faces of the sides of the housing, a rotary shaft passing through the housing, a hollow disk fixed on said shaft and provided on its side faces with shearing devices coacting with the shearing means on the housing, and means for rotating the said shaft.

4. In an apparatus for shearing cane stalks, the combination of a hollow housing, the upper portion of which is hinged at one end to the lower portion, shearing means on the inner faces of said housing, a shaft passing through the housing, a disk keyed to said shaft and provided on its opposite faces with shearing devices co-acting with the shearing devices on the housing for cutting the cane into fibrous shreds, and means for feeding cane stalk into the housing between it and the disk, the said housing having a discharge opening adjacent its base.

5. In an apparatus for shearing cane stalks, a sectional housing for a rotating disk comprising two sections having peripheral flanges secured together and forming a portion of said housing, a shaft passing through the said sections, a disk fixed to said shaft and composed of two sections each having a flanged periphery, the said flanges being secured together forming a hollow disk, the said frame or housing and the disk having opposed shearing means for cutting the cane stalks into a fibrous mass, and the housing having a feed opening for the stalks and a discharge opening for the sheared fibrous sections of the stalks.

6. In an apparatus for shearing cane stalks to produce a fibrous excelsior or hay like mass, the combination of a hollow frame comprising sections secured together and forming a housing and provided with feed openings, a shaft passing through the side members of the housing and carrying a rotary disk, the said housing and disk having coacting shearing devices for cutting the stalks lengthwise into fibrous sections, spouts leading to the feed openings in the housing, a hopper and tubes leading from the hopper to the several spouts.

7. In an apparatus for shearing cane stalks, the combination of a hollow frame, comprising sections secured together and forming a housing, a shaft passing through the sides of the housing and carrying a disk, co-acting means on the inner side faces of the housing and outer faces of the disk for shearing the cane stalks into an excelsior or hay like mass, a hopper, conveyor tubes leading respectively from said hopper to the openings in the sides of the housing for feeding cut cane to the latter and feed mechanism in said conveyor tubes for positively feeding the cut cane to the inside of the housing.

8. In an apparatus for shearing cane stalks, the combination of a hollow frame or housing, a hopper, a series of discharge tubes leading from said hopper to the hollow frame, positive feeders, one for each discharge tube, a shaft passing through the housing and a fixed disk on the shaft, the said disk and housing having co-acting devices for shearing the cut stalks as they are fed from the hopper.

9. A machine for disintegrating sugar can stalks comprising in combination a housing having two spaced side walls, rotary means located between and spaced from said side walls, cooperating cane splitting devices carried respectively by said side walls and said rotary means, a hopper and connections for delivering cane stalks simultaneously from said hopper to the spaces between said side walls and said rotary means.

10. A machine for disintegrating cane stalks comprising a housing having two vertically arranged spaced side walls, rotary means located between and spaced from said side walls, and arranged to rotate on a substantially horizontal axis, said side walls having feed openings adjacent said axis, cooperating cane splitting devices carried respectively by said side walls and said rotary means, a hopper and connections for delivering said cane stalks from said hopper simultaneously through said openings to the spaces between said side walls and said rotary means.

11. A machine for disintegrating cane stalks comprising a housing having a movable section and a vertically arranged side wall, means for pivotally supporting the movable section of the housing to swing on a substantially horizontal axis, a disk mounted to rotate on a substantially horizontal axis and spaced from the side wall of said housing, and cane disintegrating devices carried respectively by the side wall of the housing and said disk.

12. A machine for disintegrating cane stalks comprising a housing having a movable section, a rotary disk spaced from one wall of said housing, means for pivotally supporting the movable section of said housing, and cane disintegrating devices carried respectively by the rotary disk upon one side thereof and by the opposed wall of the housing.

13. In an apparatus for shredding sugar cane stalks which have been cut into short sections, the combination of a casing comprising sections secured together, the upper half of the casing thus formed being hinged at one end to the lower section, the said casing having feed openings at its center, shredding cutters secured to the inner faces of the casing, a shaft passing centrally through the casing, a disk on said shaft and shredding blades or cutters on said disk.

In testimony whereof, I have signed this specification.

WILLIAM HENRY MORGAN.